United States Patent
Oyaizu

(10) Patent No.: US 6,175,381 B1
(45) Date of Patent: Jan. 16, 2001

(54) IMAGE PROCESSING METHOD AND IMAGE PROCESSING APPARATUS

(75) Inventor: Hideki Oyaizu, Tokyo (JP)

(73) Assignee: Sony Corporation, Tokyo (JP)

(*) Notice: Under 35 U.S.C. 154(b), the term of this patent shall be extended for 0 days.

(21) Appl. No.: 09/055,565

(22) Filed: Apr. 6, 1998

(30) Foreign Application Priority Data

Apr. 7, 1997 (JP) .................................................. 9-088006
Oct. 14, 1997 (JP) .................................................. 9-279999

(51) Int. Cl.[7] .................................................. H04N 5/275
(52) U.S. Cl. .......................... 348/139; 348/585; 348/586
(58) Field of Search ............................ 348/61, 135, 139, 348/584, 585, 586, 587, 590, 591, 592, 598

(56) References Cited

U.S. PATENT DOCUMENTS 5,194,941 * 3/1993 Grimaldi .............................. 348/587
5,280,337 * 1/1994 DesJardins ........................... 348/659
5,937,104 * 8/1999 Henderson ........................... 348/586

* cited by examiner

Primary Examiner—Howard Britton
(74) Attorney, Agent, or Firm—Limbach & Limbach L.L.P.

(57) ABSTRACT

In an image processing method and an image processing apparatus in which information on the distance to a subject is successively allocated to each pixel of a processing target picture to generate a distance image, a key signal is generated from the processing target picture, and a distance image is subjected to keying processing on the basis of the key signal, whereby the outline can be displayed clearly when pictures are superimposed to generate a composite image on the bass of the distance image.

20 Claims, 6 Drawing Sheets

FIG.1
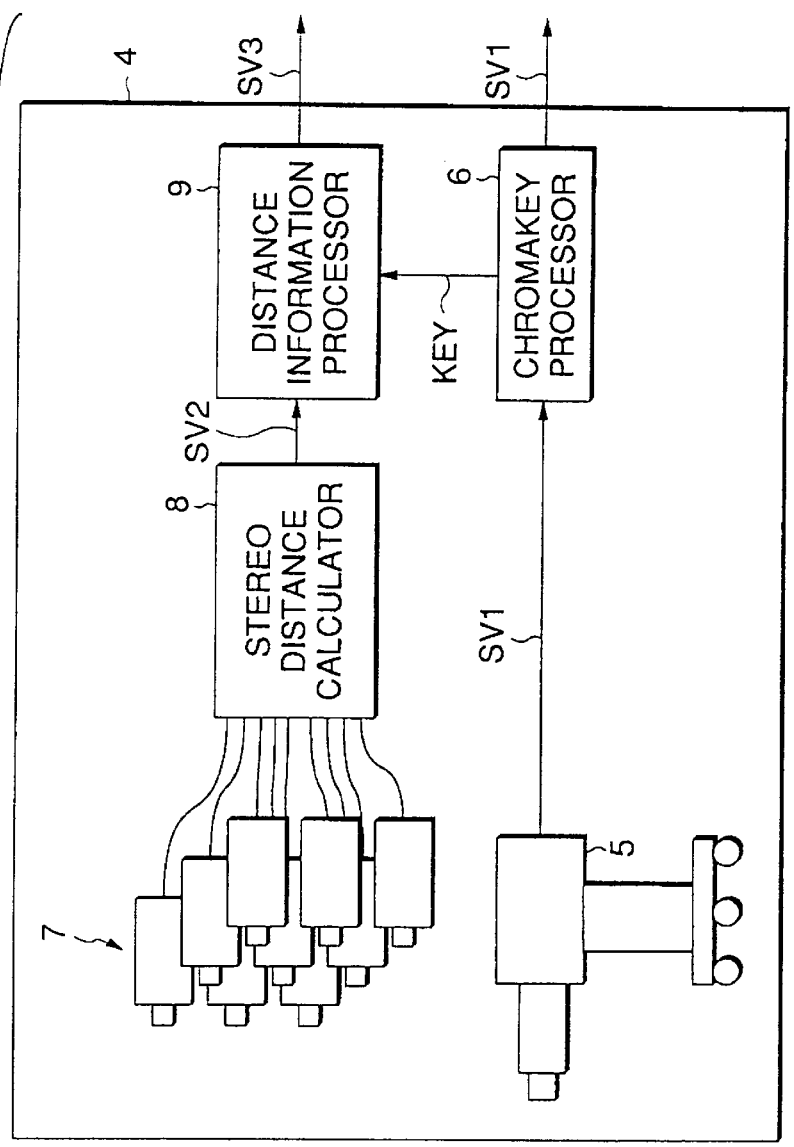
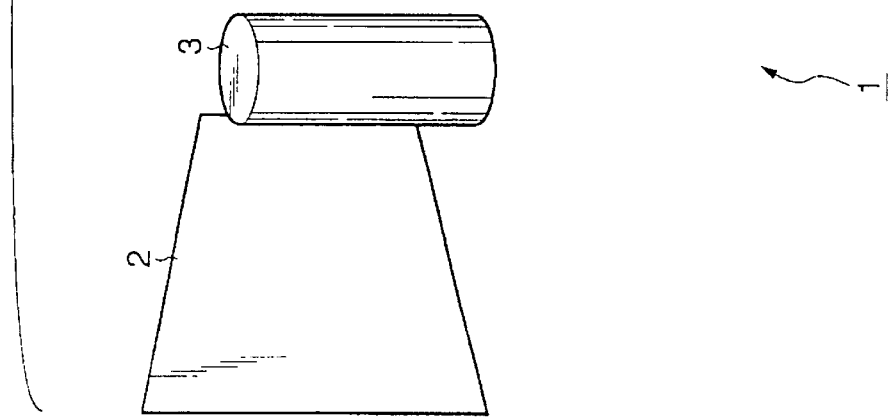

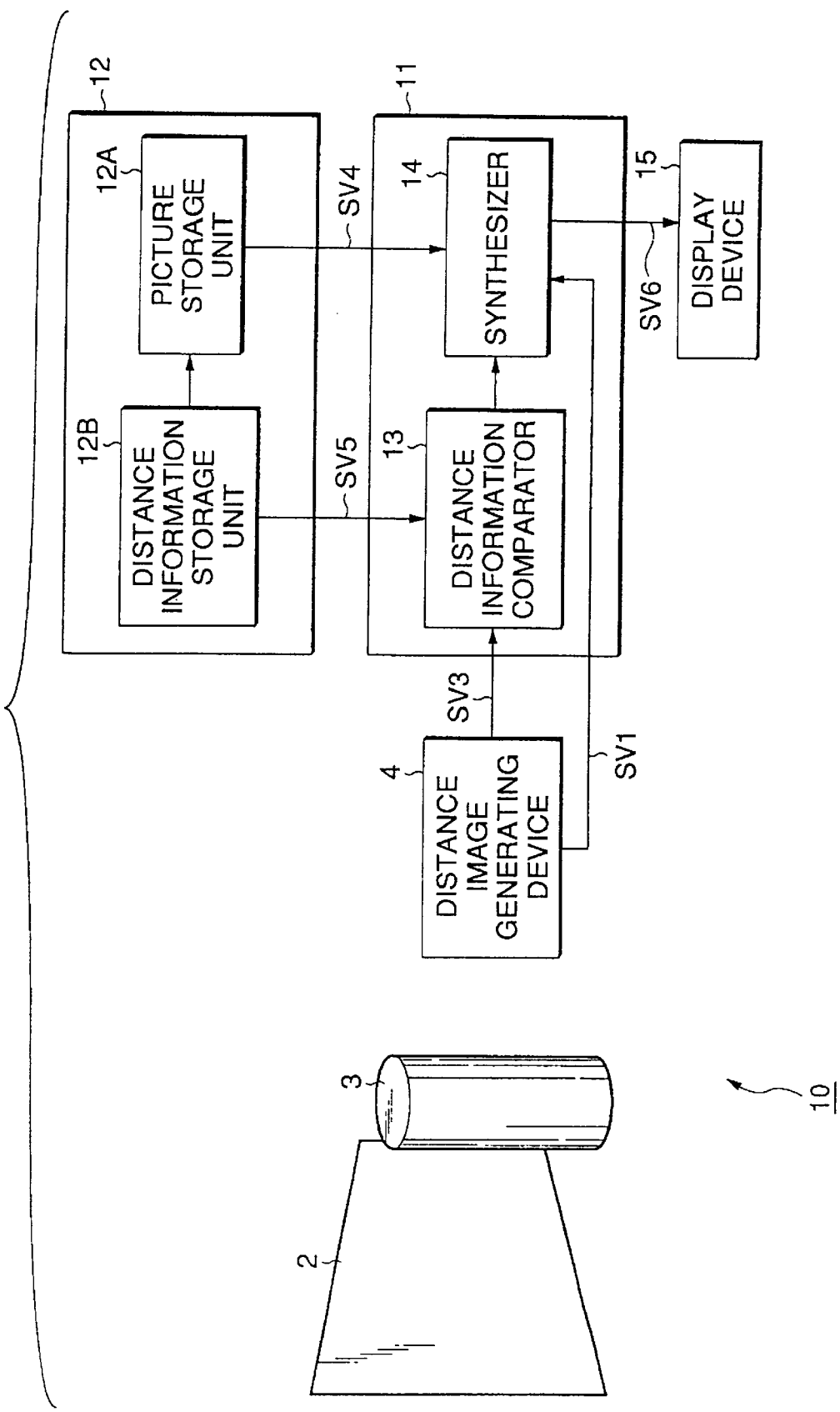

FIG.6
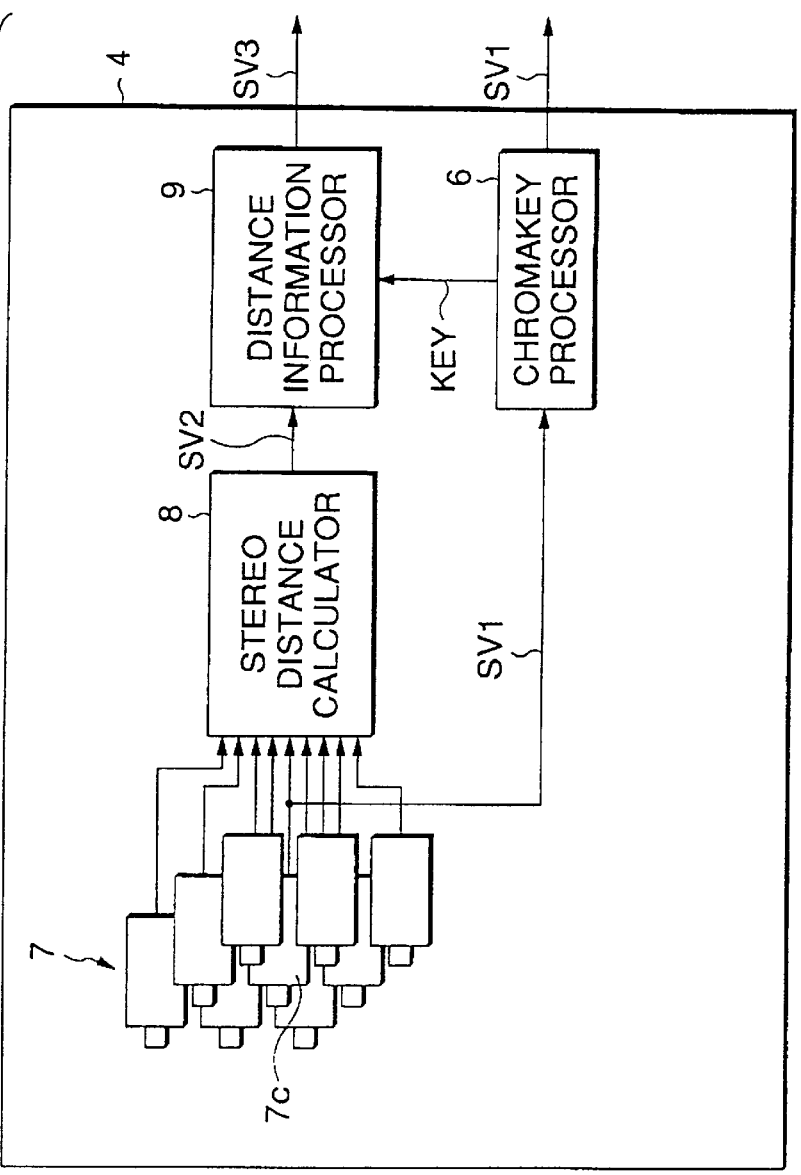
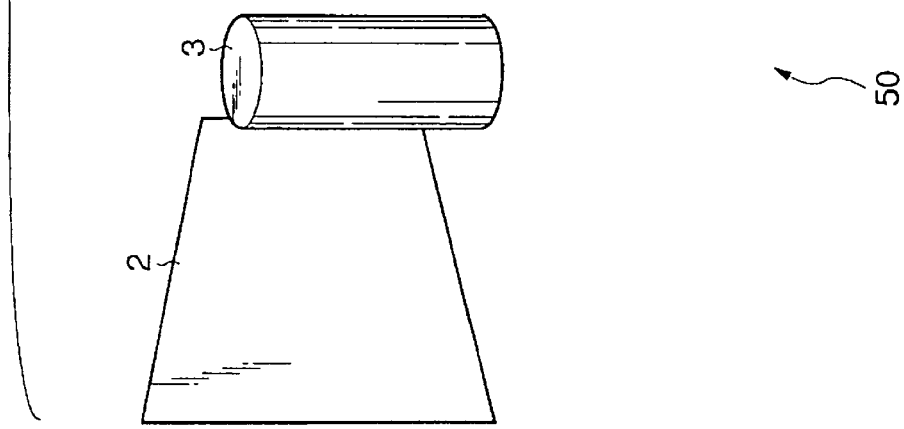

IMAGE PROCESSING METHOD AND IMAGE PROCESSING APPARATUS

BACKGROUND OF THE INVENTION

1. Field of the Invention

The present invention relates to an image processing method and an image processing apparatus, and more particularly to an image processing method and an image processing apparatus in which a distance image obtained by allocating distance information to each pixel is masked with a key signal generated from a processing target image, thereby clearly displaying the outline of a synthesized image based to the distance image.

2. Description of the Related Art

It has been hitherto adopted in a broadcasting studio, etc., that a picture obtained by a live camera, a picture based on computer graphics, etc. are superimposed on one another by using a chromakey method, and the composite image thus formed is used for broadcasting or the like. That is, according to the image composite technique based on the chromakey method, a picture of an object such as a person or the like who stands in front of a predetermined screen is picked up by a television camera. The screen is designed to have a color such as blue, green or the like which excludes colors contained in the picture of the object. A key signal is generated on the basis of the color of the screen from the picture signal from the television camera, and the picture signal based on the computer graphics and the picture signal from the television camera are subjected to keying processing on the basis of the key signal.

Accordingly, according to the image composite technique based on the chromakey method, various pictures can be generated as if a person exists in a virtual space based on computer graphics, at a remote place or the like.

In the conventional chromakey processing, the pictures are superimposed on the basis of the key signal based on the color of the background without taking the distance of the object from the television camera into consideration, and thus this technique has a problem that it is difficult to obtain such a composite image having a far-and-near background as if a person who appears from the back of an object based on computer graphics moves to the front side of the object.

A method of solving this problem may be a method of superimposing pictures on the basis of a keying based on distance information in place of the keying based on the color. That is, for every picture to be superimposed, information on the distance to an imaging device is successively set to each pixel to generate a picture (hereinafter referred to as "distance image"). Here, when the distance image is observed through a monitor, the distance from each pixel to the object is represented by light and darkness of the pixel.

In the case where the object is based on the computer graphics, the distance image can be generated by calculating the distance between the viewing point and the object for each pixel and successively allocating the distance information thus obtained to each pixel. On the other hand, in the case where the object is taken on the spot, the distance image can be generated by stereoscopically viewing the object from a plurality of imaging devices and detecting the parallax of every pixel between the pictures obtained by the a plurality of imaging devices.

In the image composite technique using the keying based on the distance information, the corresponding distance information is successively compared between these two distance images (the distance image of the picture taken on the spot and the picture based on the computer graphics) to successively select image data at the viewing point side from the two processing target pictures. This processing is executed on continuous pictures to generate such a picture sequence that a person on the spot which appears from the back of an object moves to the front side of the object.

The distance image based on the picture taken on the spot is actually generated as follows: a predetermined area comprising a plurality of pixels is successively displaced on an image serving as a comparison target to detect a position at which the images picked by the imaging devices are coincident with each other, the displacement of the predetermined area between these images is detected, and the displacement of this area thus detected is set as the parallax of the center pixel in this area. Accordingly, it is difficult to accurately calculate the distance at the edge portion of the subject and at the background side in the distance image which is generated for every predetermined area comprising a plurality of pixels as described above. Therefore, the outline of the composite image is displayed unclearly, and the image quality of the composite image is lowered.

OBJECT AND SUMMARY OF THE INVENTION

The present invention has been implemented in view of the foregoing, and has an object to provide an image processing method and an image processing device which can clearly display the outline of a composite image based on a distance image.

In order to attain the above object, an image processing apparatus and an image processing method for successively allocating information on the distance to a subject to each pixel of a processing target image to generate a distance image, is characterized in that a key signal is generated from the processing target image and the distance image is subjected to keying on the basis of the key signal.

The image processing apparatus and image processing method processes a processing target image on the basis of distance information by using distance information obtained by successively allocating information on the distance to a subject to each pixel of the processing target image. The image processing apparatus and method is further characterized in that a key signal is generated from the processing target image, the distance image is subjected to keying on the basis of the key signal, and the processing target image is superimposed on one or more composite target images.

Even when it is difficult to detect accurate distance information at a portion in the neighborhood of the outline of a background portion, the processing corresponding to the background can be performed at this portion by a key signal generated from a processing target image. If the distance image is masked by the key signal generated from the processing target image and then the processing target image is processed, whereby the outline can be represented clearly and the reduction of image quality of the outline can be suppressed. Further, if the distance image is masked by the key signal generated from the processing target image and the processing target image is processed, the accurate distance information can be obtained at the portion in the neighborhood of the outline of the background portion, and thus even when the image is superimposed on a composite target image on the basis of the distance image, a composite image having clear image quality can be obtained even in the neighborhood of the outline.

BRIEF DESCRIPTION OF THE DRAWINGS

FIG. 1 is a block diagram showing an image processing system according to a first embodiment of the present invention;

FIG. 3 is a block diagram showing an image processing system according to a second embodiment of the present invention;

FIG. 6 is a block diagram showing an image processing system according to another embodiment of the present invention.

DETAILED DESCRIPTION OF THE PREFERRED EMBODIMENTS

Figure 2A:
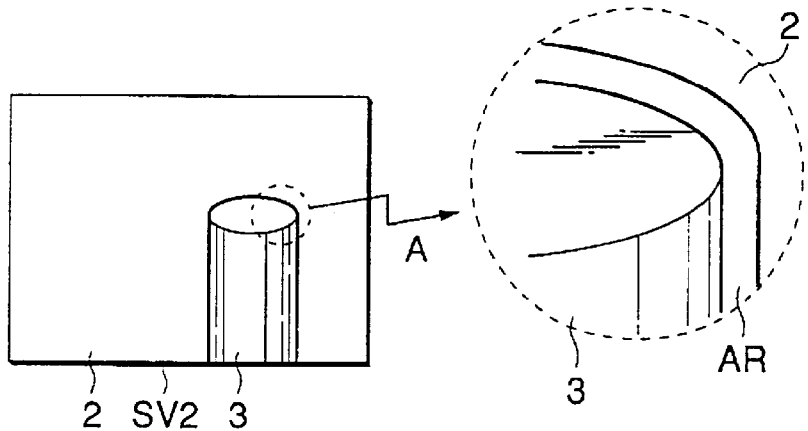
FIGS. 2A to 2C are schematic diagrams showing the operation of the image processing system shown in FIG. 1.

Preferred embodiments according to the present invention will be described hereunder with reference to the accompanying drawings.

(1) First Embodiment

FIG. 1 is a block diagram showing an image processing system according to a first embodiment of the present invention.

The image processing system 1 of this embodiment picks up a picture of an object 3 disposed in front of a screen 2, generating a distance image of the object 3 in a distance image generating device 4 so that the picture of the object 3 can be superimposed on a desired picture, and outputs the distance image together with the pickup result of the object 3.

The screen 2 is a monochromatic screen having a color which is not contained in the object 3, for example, a blue or green color is used as the color of the screen. The distance image generating device 4 picks up a picture of the object 3 to generate the distance image of the object 3 on the basis of the pickup result, and outputs the distance image together with the pickup result.

That is, in the distance image generating device 4, a television camera 5 picks up the picture of the object 3 under the background of the screen 2, and outputs a digital video signal SV1 as the picture pickup result. A chromakey processor 6 applies a chromakey method to generate a key signal KEY on the basis of the digital video signal SV1. That is, the chromakey processor 6 generates the key signal KEY so that the portion corresponding to the background is weighted to zero on the basis of the color of the background and the portion corresponding to the object 3 is weighted to 1, and then outputs the key signal KEY to the distance information processor 9. Further, the chromakey processor 6 corrects the output timing of the input digital video signal SV1 so that the output timing is synchronized with the timing at which a distance information processor 9 outputs a digital distance signal SV3, and outputs it to external equipment.

A stereo image pickup device 7 comprises nine television cameras arranged in horizontal and vertical directions, for example. Of these television cameras, the television camera at the center of the arrangement is set as a reference television camera, for example. The stereo image pickup device 7 is supported so that the reference television camera is kept in predetermined positional relationship with a television camera 5, and it is designed to stereoscopically view the object 3 under the background of the screen 2.

A stereo distance calculator 8 receives the digital video signals output from the respective television camera of the stereo image pickup device 7, and the parallax of each pixel between the pictures comprising the digital video signals from the respective television cameras is detected to calculate distance information for each pixel of the picture of the reference television camera.

That is, the stereo distance calculator 8 cuts out a prescribed area on the basis of the picture of the reference television camera, and the cut-out prescribed area is successively displaced on the pictures of the other television camera. Further, the stereo distance calculator 8 calculates the difference value between the image of the prescribed area and the image of another television camera which is superimposed on the image of the prescribed area at each displacement position, and the minimum value of the total of the calculated difference value of every picture. Accordingly, the stereo distance calculator 8 successively detects the displacement position at which the minimum value of the total of the difference values from the image of the predetermined area on each picture obtained by the other television cameras, and the displacement amount at the displacement position is set as the parallax at the center pixel of the cut-out area.

At this time, the stereo distance calculator 8 detects the parallax between the respective television cameras arranged in the horizontal and vertical directions, and processes the parallax detection results statistically to enhance the measurement precision of the distance information.

The stereo distance calculator 8 repeats the above processing for each pixel of the picture obtained by the reference television camera to generate a distance image.

The stereo distance calculator 8 allocates the calculated distance information to the image data representing the brightness level of each pixel and transmits the data according to the format of the digital video signal SV1, whereby the stereo distance calculator 8 outputs the digital distance signal SV2 obtained by allocating the distance information to each pixel corresponding to the object 3 as show in FIG. 2A. At this time, in the distance image based on the digital distance signal SV2 is formed an area AR which is obtained by allocating distance information adjacent to the object side to the portion of the screen as if it is displaced from the outline of the object 3 to the screen side as indicated by an arrow A. Therefore, if a composite image is formed on the basis of only this distance information, the object 3 is displayed while the outline thereof is unclear.

Figure 2B:
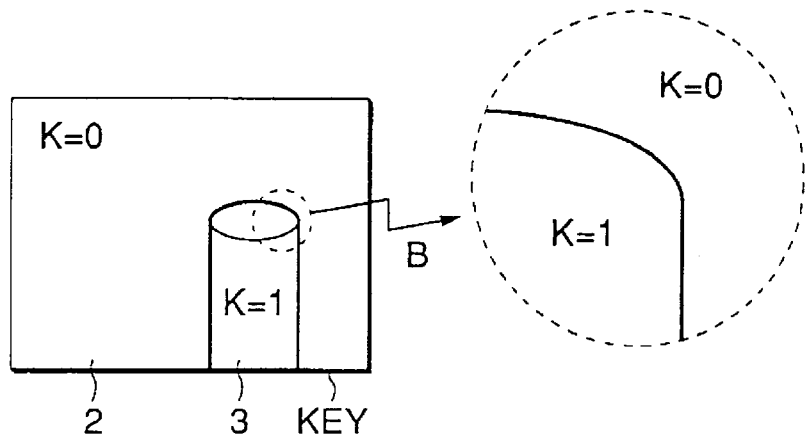
Figure 2C:
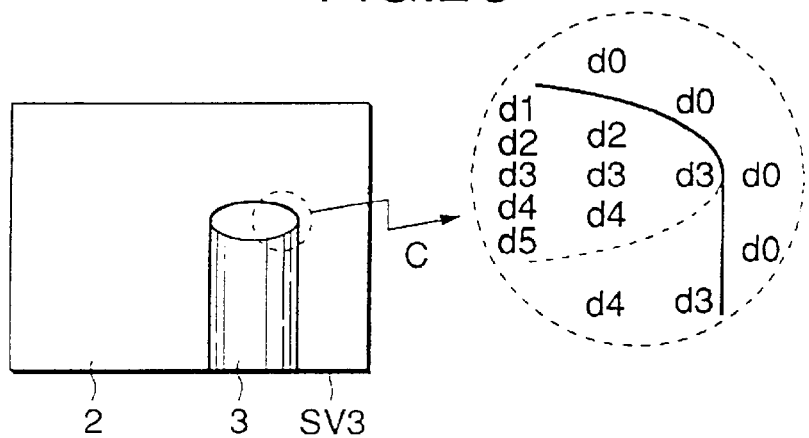

The distance information processor 9 outputs this digital distance signal SV2 by a keying processing in response to a signal from the chromakey processor 6. Here, the distance information processor 9 multiplies the distance information of the corresponding pixel and the key signal KEY (FIG. 2B) which is set to a value "1" (k=1) at the portion corresponding to the object 3 and to a value "0" (k=0) at the portion corresponding to the screen 2, thereby masking the distance image with the key signal (FIG. 2C). Accordingly, as indicated by arrows B and C, the distance information processor 9 corrects to the distance information d0 of the screen 2 the distance information which is set so as to be displaced to the screen side.

The distance information processor 9 outputs the detected distance information as a digital distance signal SV3 based on the format corresponding to the digital distance signal SV2. In the image processing system 1, a picture based on the computer graphics and a picture based on the digital video signal SV1 superimposed on each other to form a composite image thereof on the basis of the distance image based on the digital distance signal SV3.

In the above construction, the picture of the object 3 is picked up under the screen 2 as the background by the television camera 5, the picture pickup result is input to the chromakey processor 6 on the basis of the digital video signal SV1, and the key signal KEY which weights the screen 2 and the object 3 to zero and 1 respectively is generated in the chromakey processor 6. The picture of the object 3 is also picked up by nine television cameras which constitute the stereo image pickup device 7, and the distance image is generated on the basis of the picture pickup result and the stereo distance calculator 8.

In the distance image (FIG. 2A), the distance information of the screen 2 is not accurately calculated in the background area AR which is located in the neighborhood of the outline of the object 3. However, this area AR is masked by the key signal KEY from the chromakey processor 6 in the distance information processor 9, and thus the distance information of the background portion AR in the neighborhood of the outline of the object 3 is corrected. Accordingly, for the object 3, the digital video signal SV1 output from the chromakey processor 6 and another digital video signal are superimposed on each other on the basis of the masked distance image, and the background area AR (which is the portion surrounding the outline of the object 3) is subjected to the background processing, whereby the composite image having a clear outline can be generated.

According to the above construction, the distance image is masked by the key signal, and thus the background area AR which is adjacent to the outline of the object 3 can be subjected to the processing corresponding to the background. Therefore, the outline of the object 3 can be clearly represented in the composite image, whereby the reduction of the image quality of the composite image can be suppressed.

(2) Second Embodiment

FIG. 3 is a block diagram showing an image processing system according to a second embodiment. In this image processing system 10, the digital video signal SV1 output from the distance image generating device 4 and the digital video signal SV4 stocked in predetermined storage means are superimposed. In the second embodiment of FIG. 3, the same elements as the first embodiment are represented by the same reference numerals, and the duplicative description thereof is omitted.

That is, in the image processing system 10, an image stocking device 12 comprises an optical disc device, and it serves to stock a digital video signal SV4, a digital distance signal SV5 which is generated by picking up pictures of other objects. The image stocking device 12 outputs the digital video signal SV4 and the digital distance signal SV5 thus stocked at the timing which is synchronized with the digital video signal SV1 and the digital distance signal SV3 which are output from the distance image generating device 4. As described above, the image stocking device 12 has a picture storing unit 12A for storing a video signal which is a composite target, and a distance information storage unit 12B for storing the distance image of the video signal.

An image composite device 11 successively compares the distance information between the two distance images based on the digital distance signal SV3 from the distance image generating device 4 and the digital distance signal SV5 from the image stocking device 12 in a distance information comparator 13 which comprises a comparison circuit, and outputs the comparison result.

A composite unit 14 successively selects image data behind the viewing point (television camera 5) from the two images comprising the digital video signals SV1 and SV4 on the basis of the comparison result of the distance information comparator 13, and outputting the digital video signal SV6 of the composite image. A display device 15 displays the digital video signal SV6.

According to the construction of FIG. 3, for the images stocked in the image stocking device 12 such as an optical disc device or the like, the distance image is masked by using the key signal in the distance image generating device 4, whereby a composite image having a clear outline can be obtained even when an object on an image based on the distance image generating device 4 is overlaid on or behind an object on an image based on the distance image generating device 4.

(3) Third Embodiment

Figure 4:
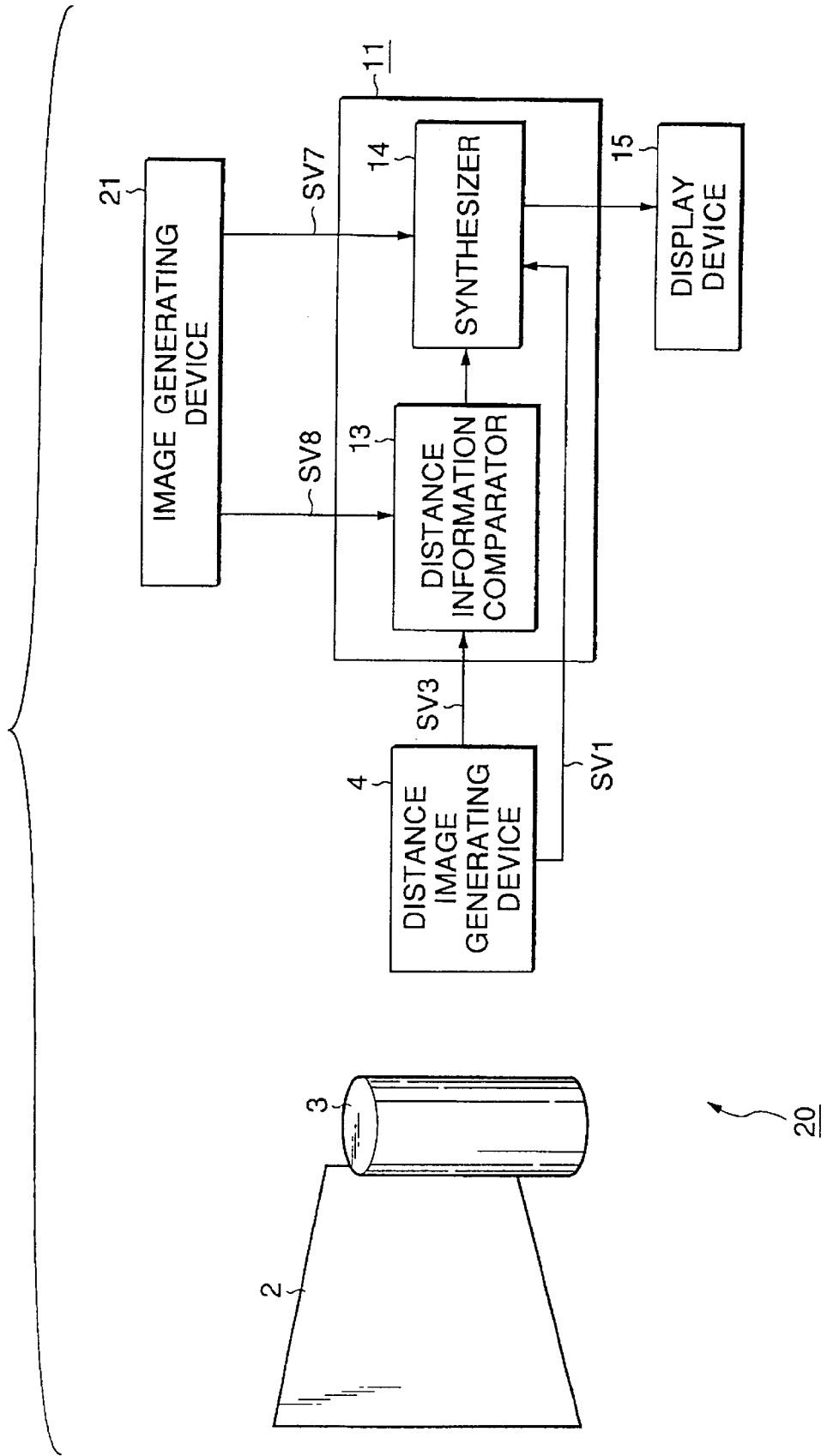
FIG. 4 is a block diagram showing an image processing system according to a third embodiment of the present invention.

FIG. 4 is a block diagram showing an image processing system according to a third embodiment of the present invention. In this embodiment, an image generating device 21 is disposed in place of the image stocking device 12 of the second embodiment. Here, the image generating device 21 generates a desired image by the computer graphics, and outputs a digital video signal SV7 and a digital distance signal SV8 on the basis of the image.

The image generating device 21 generates a digital video signal SV7 of a desired image by using a computer, and also operates distance information for each pixel of this image to generate a digital distance signal SV8. Accordingly, in the image processing system 20, a picture generated by the computer graphics and a picture which is picked up by the distance image generating device 4 are superimposed on each other.

According to the construction of FIG. 4, even when a composite image with an image generated by the computer graphics is generated, the same effect as the first embodiment can be obtained by masking the distance image with the key signal.

(4) Fourth Embodiment

Figure 5:
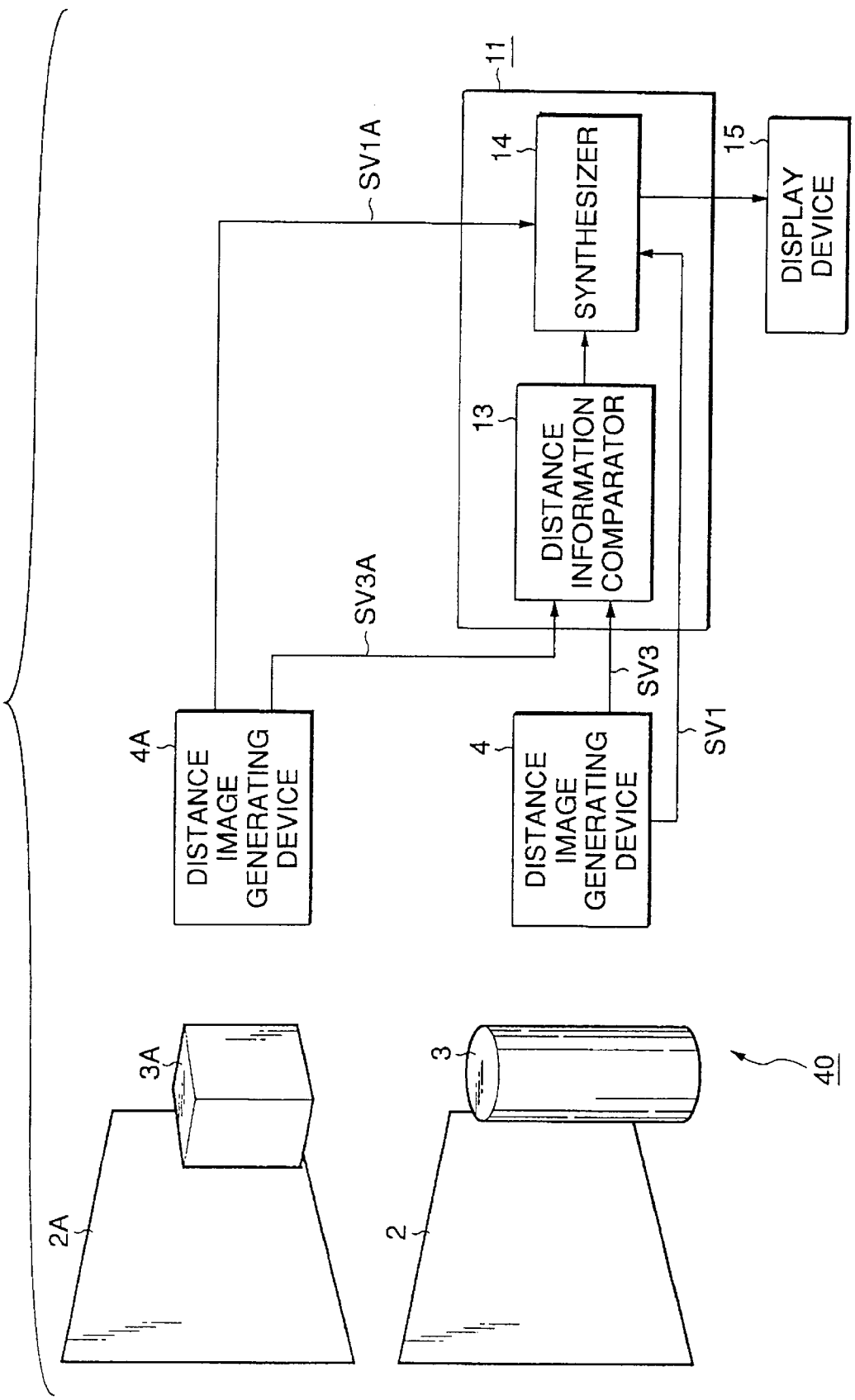
FIG. 5 is a block diagram showing an image processing system according to a fourth embodiment of the present invention.

FIG. 5 is a block diagram showing an image processing system according to a fourth embodiment. In this embodiment, a distance image generating device 4A is disposed in place of the image stocking device 12 of the second embodiment.

Here, the distance image generating device 4A has the same construction as the distance image generating device 4. It picks up a picture of a desired object 3A under the background of a screen 2A similar to the screen 2 in the distance image generating device 4, and outputs a digital video signal SV1A and a digital distance signal SV3A which correspond to the picture pickup result.

According to the construction of FIG. 5, even when pictures are superimposed by using two live cameras, the same effect as the first embodiment can be achieved by masking the distance image with a key signal.

(5) Another Embodiment

In the above embodiments, the picture of the object 3 is picked up by the television camera 5 which is separated from the nine television cameras constituting the stereo image pickup device 7, and the picture of the object is subjected to composite processing. However, the present invention is not limited to the above embodiments, and a picture which is picked by using one of plural television cameras constituting the stereo image pickup device 7 may be subjected to the composite processing. In this case, the number of television cameras can be reduced.

That is, as shown in FIG. 6 (the same elements as FIG. 1 are represented by the same reference numerals), an image processing system 50 may be designed so that the digital video signal SV1 obtained by the television camera at the center of the nine television cameras constituting the stereo image pickup device 7 is processed by the chromakey processor 6. With this design, the parallax between the distance image and the processing target image can be nullified, and thus the quality of the processing result can be enhanced more. Further, it is unnecessary to provide a television camera 5 which is different from the stereo image pickup device 7, and thus the number of television cameras can be reduced.

In the above embodiments, the distance image is masked by using the key signal having the value "1" and the value "0". However, the present invention is not limited to this mode, and the masking may be performed by a so-called soft key manner, if necessary. In this case, the clarity of the outline of the composite image can be varied in various levels by changing the condition for generating the key signal.

Further, in the above-described embodiments, the images are superimposed on the basis of two kinds of digital video signals. However, the present invention is not limited to this mode, and three or more kinds of images may be superimposed, if necessary.

Still further, in the above-described embodiments, the images are superimposed on the basis of the digital video signals. However, the present invention is not limited to this mode, and images may be superimposed on the basis of analog video signals.

As described above, according to the present invention, the distance image obtained by allocating the distance information to each pixel is masked by the key signal generated from the processing target image, whereby the outline can be displayed clearly in a composite image based on the distance image.

The present invention is not limited to the above-described embodiments, and various modifications or applications may be performed without departing from the subject matter of the present invention.

What is claimed is:

1. An image processing apparatus for successively allocating distance information to a subject to each pixel of a processing target picture to generate a distance image, comprising:

a key signal generating unit for generating a key signal from the processing target image;

a distance image generating device for generating a distance image comprised of distance information correspondingly allocated to each of a plurality of pixels defining said processing target picture; and a key processing unit for subjecting the distance image to keying on the basis of the key signal.

2. The image processing apparatus as claimed in claim 1, wherein said distance image generating device comprises a distance calculating unit for calculating a digital distance signal of the processing target picture from digital video signals which are obtained by picking up pictures of said subject with a plurality of television cameras arranged in horizontal and vertical directions, thereby generating the distance image.

3. The image processing apparatus as claimed in claim 2, wherein said key signal generating unit includes chromakey processing unit for generating the key signal by using a digital video signal which is obtained by one of said plural television cameras arranged in the horizontal and vertical directions or a television camera which is disposed separately from said plural television cameras.

4. The image processing apparatus as claimed in claim 2, wherein said distance calculating unit sets as a reference television camera a television camera located substantially at the center of said plural television cameras, and calculates a displacement amount between the digital video signal output from said reference television camera and the digital video signal output from each of said plural television cameras, thereby calculating the digital distance signal.

5. An image processing apparatus for successively allocating information on the distance to a subject to each pixel of a processing target picture to generate a distance image, and processing the processing target image on the basis of the distance information, comprising:

a key signal generating unit for generating a key signal from the processing target image;

a key processing unit for subjecting the distance image to keying on the basis of the key signal;

a distance image generating device for generating a distance image comprised of distance information correspondingly allocated to each of a plurality of pixels defining said processing target picture; and an image composite unit for superimposing the processing target picture and one or more composite target pictures on the basis of the distance information of the distance image which is subjected to the keying by said key processing unit.

6. The image processing apparatus as claimed in claim 5, wherein said image composite unit includes image stocking unit for holding the composite target picture; and distance information holding unit for holding the distance image of the composite target picture.

7. The image processing apparatus as claimed in claim 6, wherein said image composite unit includes image comparison processing unit for successively comparing the corresponding distance information between the distance image of the composite target image and the distance image which is subjected to the keying by said key processing unit, and superimposing the processing target picture and the composite target picture on the basis of the comparison result.

8. The image processing apparatus as claimed in claim 5, wherein said image composite unit includes image generating unit for generating the composite target picture and the distance image of the composite target picture through operation processing.

9. The image processing apparatus as claimed in claim 8, wherein said image composite unit includes image comparison processing unit for successively comparing the corresponding distance information between the distance image of the composite target image and the distance image which is subjected to the keying by said key processing unit, and superimposing the processing target picture and the composite target picture on the basis of the comparison result.

10. The image processing apparatus as claimed in claim 5, wherein said image composite unit includes key signal generating unit for generating a key signal from the composite target picture, and key processing unit for subjecting the distance image of the composite target picture to keying on the basis of the key signal.

11. An image processing method comprising:

successively allocating distance information to a subject to each pixel of a processing target picture to generate a distance image;

generating a key signal from the processing target picture; and subjecting the distance image to keying on the basis of the key signal.

12. The image processing method as claimed in claim 11, further comprising a distance calculating step for calculating a digital distance signal of the processing target picture from digital video signals which are obtained by picking up pictures of said subject with a plurality of television cameras arranged in horizontal and vertical directions, thereby generating the distance image.

13. The image processing method as claimed in claim 12, wherein said step of generating a key signal comprises a chromakey processing step wherein the key signal is generated by using a digital video signal which is obtained by one of the plural television cameras arranged in the horizontal and vertical directions or a television camera which is disposed separately from the plurality of television cameras.

14. The image processing method as claimed in claim 12, wherein said distance calculating step sets as a reference television camera, a television camera located substantially at the center of the plural television cameras, and calculates a displacement amount between the digital video signal output from the reference television camera and the digital video signal output from each of the plurality of television cameras, thereby calculating the digital distance signal.

15. An image processing method comprising the steps of:

successively allocating information on the distance to a subject to each pixel of the processing target picture to generate a distance image;

processing the processing target image on the basis of the distance information wherein said method further comprises a key signal generating step for generating a key signal from the processing target image;

a key processing step for subjecting the distance image to keying on the basis of the key signal; and an image composite step for superimposing the processing target picture and one or more composite target pictures on the basis of the distance information of the distance image which is subjected to the keying by said key processing step.

16. The image processing method as claimed in claim 15, wherein said image composite step includes image stocking step for holding the composite target picture; and distance information holding step for holding the distance image of the composite target picture.

17. The image processing method as claimed in claim 15, wherein said image composite step includes image comparison processing step for successively comparing the corresponding distance information between the distance image of the composite target image and the distance image which is subjected to the keying by said key processing step, and superimposing the processing target picture and the composite target picture on the basis of the comparison result.

18. The image processing method as claimed in claim 15, wherein said image composite step includes image generating step for generating the composite target picture and the distance image of the composite target picture through operation processing.

19. The image processing method as claimed in claim 18, wherein said image composite step includes image comparison processing step for successively comparing the corresponding distance information between the distance image of the composite target image and the distance image which is subjected to the keying by said key processing step, and superimposing the processing target picture and the composite target picture on the basis of the comparison result.

20. The image processing method as claimed in claim 15, wherein said image composite step includes key signal generating step for generating a key signal from the composite target picture, and key processing step for subjecting the distance image of the composite target picture to keying on the basis of the key signal.

\* \* \* \* \*